J. R. MOFFATT.
TRIMMING MECHANISM FOR SEWING MACHINES.
APPLICATION FILED MAY 14, 1913.

1,223,718.

Patented Apr. 24, 1917.
3 SHEETS—SHEET 2.

Witnesses

Inventor
James R. Moffatt
By Sturtevant & Mason
Attorneys

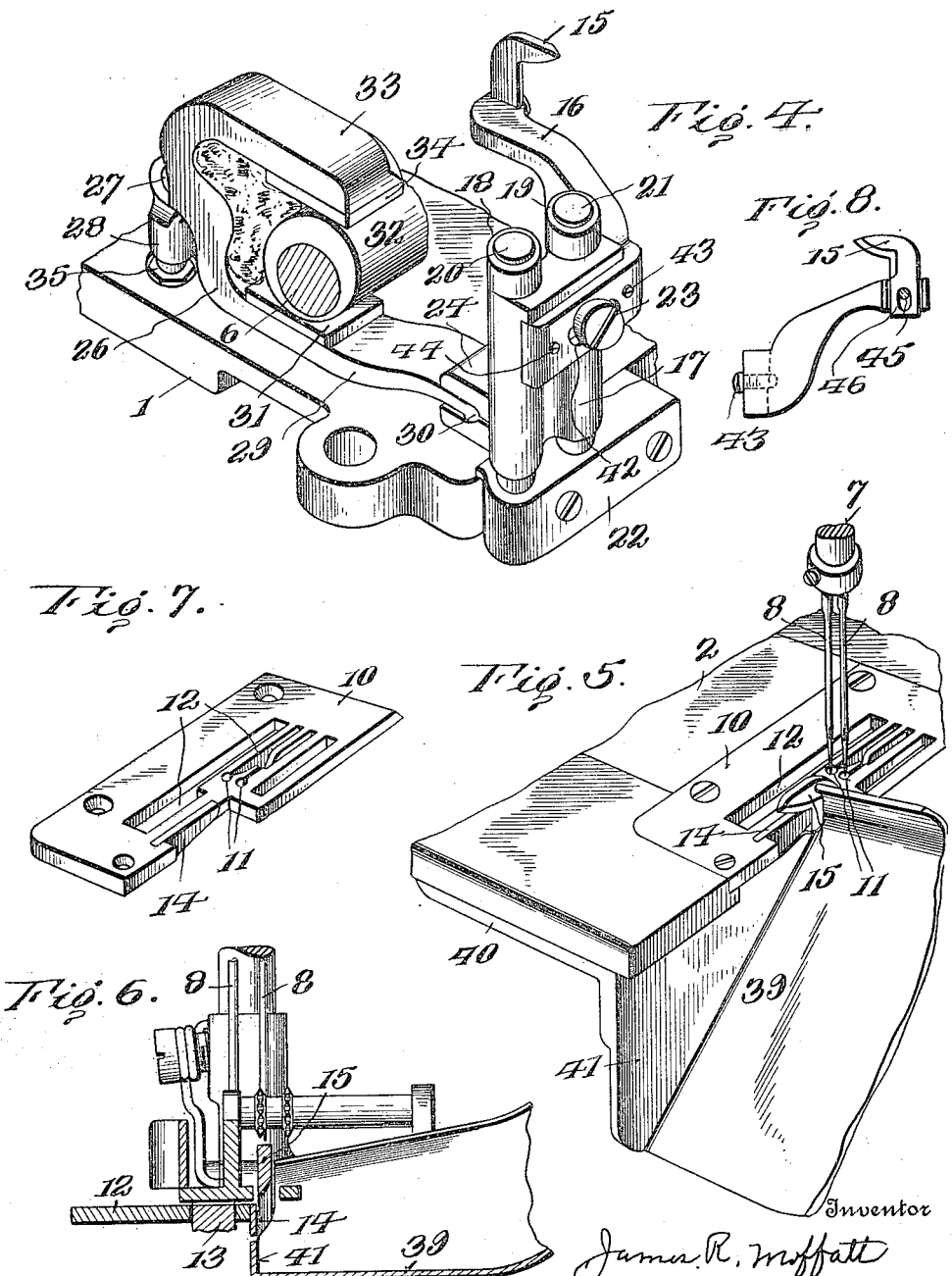

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,223,718.   Specification of Letters Patent.   Patented Apr. 24, 1917.

Application filed May 14, 1913. Serial No. 767,610.

*To all whom it may concern:*

Be it known that I, JAMES R. MOFFATT, a citizen of the United States, residing at 300 West Kinzie street, Chicago, in the county of Cook, State of Illinois, have invented certain new and useful Improvements in Trimming Mechanisms for Sewing-Machines, of which the following is a description, reference being had to the accompanying drawing and to the figures of reference marked thereon.

The invention relates to new and useful improvements in trimming mechanisms for sewing machines and more particularly to devices of this character wherein a movable blade is supported beneath the work support and projects above and overhangs the work support, where it coöperates with a stationary blade which is substantially flush with the upper surface of the work support.

Some of the objects of the invention are to provide a supporting means for a movable trimmer blade of the above character, whereby said trimmer blade may be moved up and down in substantially the same path for trimming the fabric; to also provide means which holds the movable trimmer blade from lateral movement relative to the stationary member; and to still further provide an operating mechanism for the movable trimmer member which is so constructed that the position of said operating mechanism may be readily varied for adjusting the position of the trimmer blade.

In the drawings, which show by way of illustration, one embodiment of the invention, Figure 1 is a front view of a machine having my improvements applied thereto, a part thereof being removed to show a portion of the trimming mechanism;

Fig. 2 is a transverse sectional view through the bed plate, showing the trimming mechanism in side elevation;

Fig. 3 is a plan view of the parts underneath the work support at the forward end of the machine, showing the trimming mechanism;

Fig. 4 is a perspective view of a portion of the bed plate and the trimming mechanism;

Fig. 5 is a perspective view showing a portion of the work support, the needles, trimming members, and the strip guide;

Fig. 6 is a sectional view through the presser foot and work support, and trimming members;

Fig. 7 is a perspective view of the throat plate showing the stationary trimming member.

Fig. 8 is a detail showing the manner of connecting the trimming blade to its support.

Figure 1:
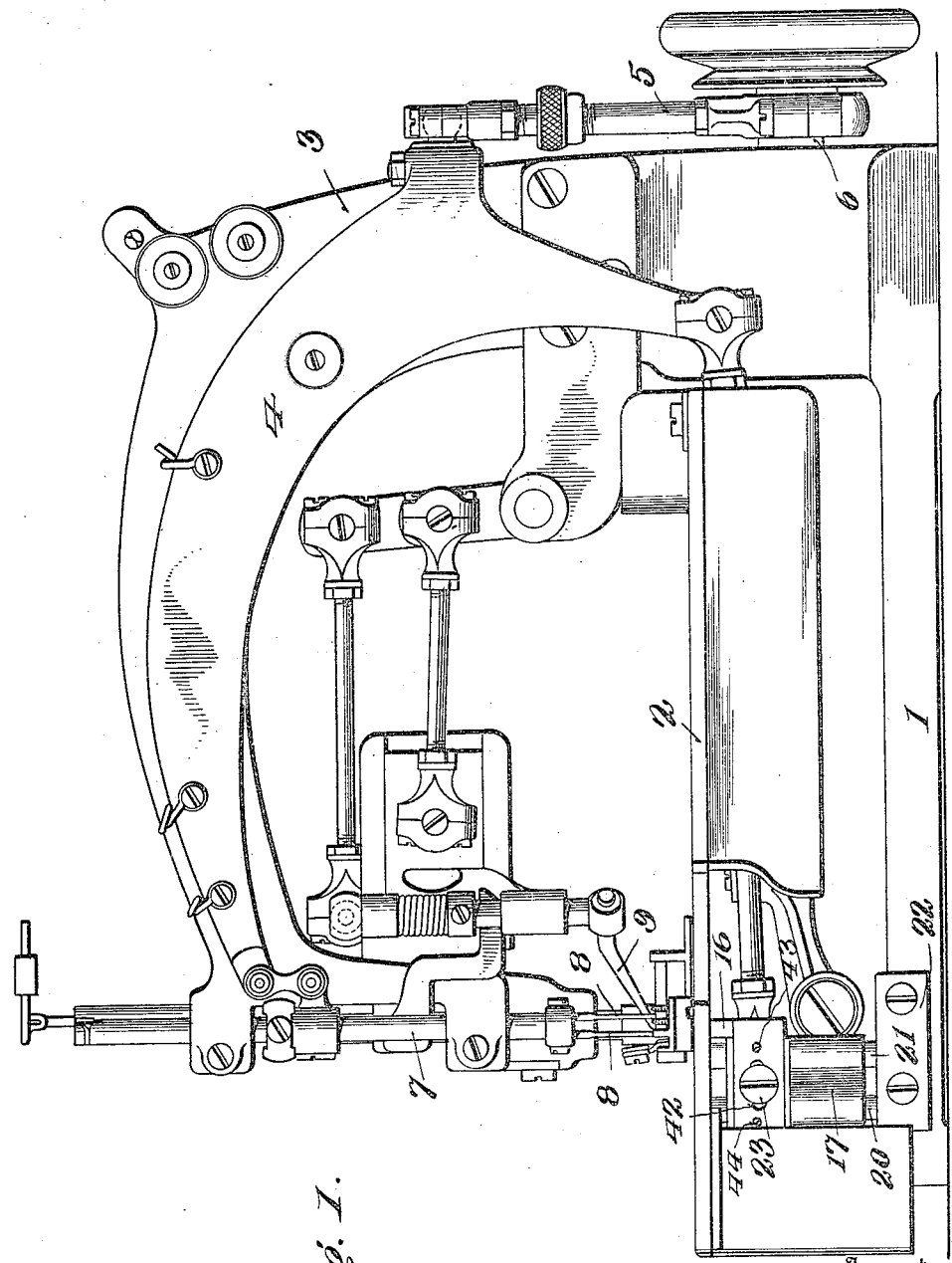
Figure 2:
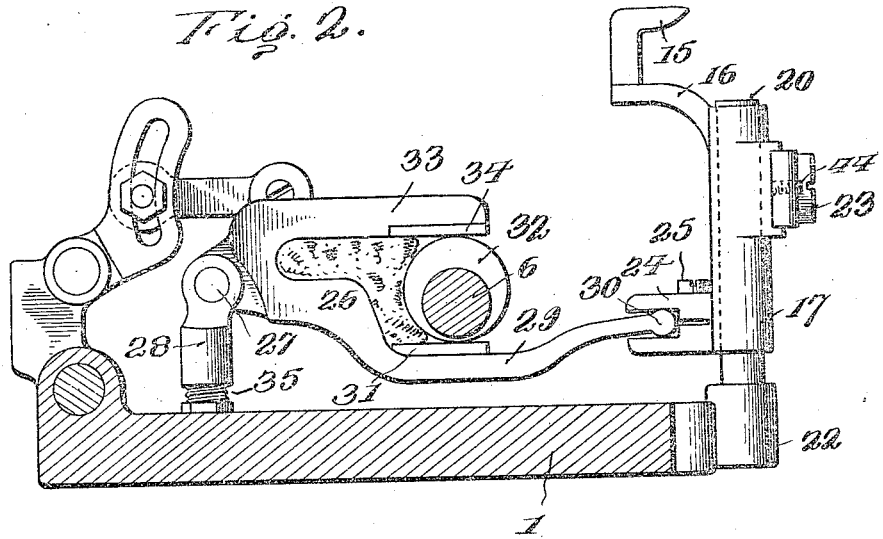
Figure 3:
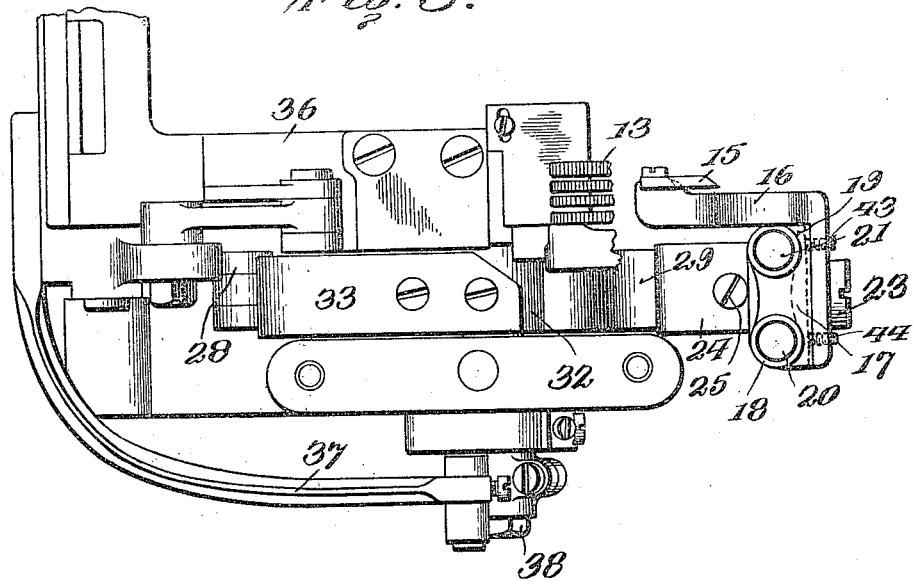

The sewing machine to which my invention has been applied consists of a bed plate 1, having a work support 2, and overhanging arm 3, on which is mounted a needle lever 4. This needle lever is oscillated by an eccentric strap 5, which engages an eccentric on the main shaft 6. A needle bar 7, as herein shown, is provided with two needles 8, 8 and is vibrated in the overhanging arm by the needle lever 4. Coöperating with the needles 8, 8 is a thread-laying device 9. These parts are of the usual construction and will not need further description at this time.

Mounted on the work support 2 is a throat plate 10, which is provided with openings 11, 11 for the needles, and openings 12 for the feed dog 13 of the machine. Also mounted in the throat plate 10 is the stationary member 14 of the trimming mechanism. This stationary member is substantially flush with the upper surface of the throat plate and may be fixed thereto in any desired way.

Coöperating with the stationary trimming member 14 is a movable trimming member or blade 15. This movable member is carried by an arm 16 and is detachably secured thereto in any suitable way. The arm 16 is mounted on a support 17, which, as herein shown, is in the form of two sleeves 18 and 19, which are joined together so as to form one solid, rigid support. These sleeves 18 and 19 freely engage guiding posts 20 and 21 respectively. The guiding posts are mounted in a bracket 22, which is secured to the bed plate, and thereby the posts are fixed to the bed plate. The sleeves 18 and 19 are adapted to slide vertically on these posts and as they move vertically up and down the trimming blade 15 will be moved up and down. The support 17 is formed with a groove or recess into which the arm 16 fits, and said arm is adjustably held therein by screw 23. By removing this screw the arm 16 may be readily removed from the machine for the purpose of grinding or replacing the trimmer blade 15.

The support 17 at the rear face thereof is formed with a forked arm 24. A screw 25 passing through the forks may be used for adjusting the position of the forks relative to each other. The support 17 is moved up and down by a rocking lever 26. This rocking lever is pivoted at 27 to a supporting post 28. Said rocking lever is formed with an arm 29 which extends underneath the main shaft 6 and is formed at its outer end with a cylindrical rib 30, which engages between the forks of the arm 24. The arm 29 is provided with a hardened plate 31, which engages the eccentric 32 on the shaft 6. The upper arm 33 of the lever 26 is also provided with a hardened plate 34, which rests on the upper face of the eccentric 32.

The supporting post 28 for the rear end of the lever 26 is forked, and said lever is provided with an ear extending between the forked ends of the upper end of the post tending through the upper end of the post and said ear forms a pivot point 27. This post is made in two parts. The lower part 35 is attached to the bed plate 1 and is threaded into the upper part of the post. This lower part is also slabbed so that it may be turned, and by the turning thereof the post is lengthened or shortened so as to raise or lower the pivot point 27 relative to the bed plate. When this pivot point is raised the lever 26 will be swung about the eccentric 32 as a fulcrum and lower the movable trimmer blade, or change the working position thereof. When the pivot point is lowered, then the movable trimming blade is raised. From this construction, it will be seen that means is provided for varying the working position of the movable trimming blade relative to the stationary blade. It will also be noted from the above construction that when the main shaft 6 rotates, the eccentric 32 will cause the lever 26 to oscillate about the pivot point 27 as a fulcrum, thus raising and lowering the support 17 on the posts 20 and 21 and, in turn, raising and lowering the movable trimming blade.

By the above construction I have provided a trimmer supporting means wherein the trimmer is moved up and down in the same path, and this path is in a vertical line. By the forming of the support with two sleeves and the using of two guiding posts, I not only guide the trimmer blade up and down in the same path, but also hold the trimmer blade from lateral movement relative to the stationary blade, as any twisting or lateral force on the blade 15 would tend to rotate the support about one post, and this would be prevented by the other post.

The feed dog 13 is carried by the feed bar 36, which is connected to the feed rocker in the usual manner. This feed rocker is moved back and forth by an arm 37, which is connected to an eccentrically located pin 38 at the forward end of the main shaft. The feed dog is timed so as to move or advance the fabric when the trimming blade is raised. This trimming blade is preferably located directly in front of one of the needles so that an edge of the fabric may be trimmed and the trimmed edge covered as it passes between the needles. A strip guide 39 is carried by a pivot bracket 40 attached to the under face of the work support. Said bracket has a vertical wall 41, which joins the strip guide. This vertical wall serves to prevent the trimmed off strip from passing underneath the work support, while the guide 39 deflects the trimmed-off strip backward toward the front of the machine and away from the operating parts arranged in rear thereof.

Referring again to the trimming member and its support, it will be noted that the arm 16 is provided with a slot 42, through which the screw 23 passes, and this slot permits the arm to be adjusted longitudinally on the support 17. Screws 43 and 44 pass through the arm and rest against the face of the support 17. These screws form abutments which determine the position of the arm relative to the face of the support. By adjusting these screws the angle of the arm 16 to the line of feed may be adjusted within small limits and the shearing action of the blades perfected. The trimming blade 15 is secured to the arm 16 by a screw 45. The blade has an enlarged opening 46 through which the screw 45 passes, and the side lips of the arm 16 are spaced so as to permit the blade 15 to be tilted so as to vary the angle of the cutting edge of the blade relative to the horizontal. By this shifting of the angle of the blade, the nose or point of the cutting blade may be raised or depressed so as to properly position the same relative to the fabric operated upon.

It will be obvious that my improved trimming mechanism may be used in connection with the stitching of two layers of material wherein the upper layer is separated from the lower layer, and the lower layer only trimmed. The projecting point of the trimming blade 15 will pass between the layers and separate the same so that the upper layer will pass over the trimming blade, while the lower layer passes underneath the same and is trimmed. The adjustment of the upper blade not only changes the angle of the cutting edge to the horizontal, but raises or lowers the point of the blade so as to prevent the same catching in the fabric passing over said blade.

It is obvious that minor changes in the details of construction and the arrangement of parts may be made without departing from the spirit of the invention, as set forth in the appended claims. It will also be obvious that the trimming mechanism herein shown and described may be used in connection with other types of sewing machines, and that the stitching mechanism illustrated is solely for the purpose of locating the arrangement of the trimming mechanism relative thereto.

Having thus described my invention, what I claim is:

1. A trimming mechanism, including in combination a work support, a fixed trimming member, a support therefor, a movable trimming member coöperating with said fixed member, said movable member being located beneath the work support, extending above and overhanging said work support, and means for supporting said movable trimming member, whereby it is moved up and down, said supporting means including devices for preventing the trimming member from moving laterally relative to the fixed member.

2. A trimming mechanism, including in combination a work support, a fixed trimming member, a support therefor, a movable trimming member coöperating with said fixed member, said movable member being located beneath the work support, extending above and overhanging said work support, and means for supporting said movable trimming member, whereby it is moved up and down, said supporting means including spaced posts and spaced sleeves engaging said posts and having movement relative thereto in a direction at right angles to the work support.

3. A trimming mechanism including in combination, a work support, a fixed trimming member, a support therefor, a movable trimming member coöperating with said fixed member, said movable member being located beneath the work support, extending above and overhanging said work support, means for supporting said movable trimming member whereby it is moved up and down, said supporting means including spaced posts and spaced sleeves engaging said posts and having movement relative thereto in a direction at right angles to the work support, a lever connected to said sleeves, a shaft, an eccentric on the shaft coöperating with said lever, and means for pivotally supporting said lever.

4. A trimming mechanism including in combination, a work support, a fixed trimming member, a support therefor, a movable trimming member coöperating with said fixed member, said movable member being located beneath the work support, extending above and overhanging said work support, means for supporting said movable trimming member whereby it is moved up and down, said supporting means including spaced posts and spaced sleeves engaging said posts and having movement relative thereto in a direction at right angles to the work support, a lever connected to said sleeves, a shaft, an eccentric on the shaft coöperating with said lever, and means for pivotally supporting said lever, said pivotal support for said lever being adjustable for shifting the vibrating position of said sleeve.

5. A trimming mechanism including a movable trimming blade, a support for said movable blade, means for guiding the support, whereby it is moved up and down in the same path, a lever connected to said support, a shaft, an eccentric on said shaft, said lever having means coöperating with said eccentric and a fulcrum support for said lever, said fulcrum support being located at the rear end of the lever and including means whereby it may be adjusted for turning the lever about the eccentric to vary the working position of the movable trimming member.

6. A trimming mechanism including in combination a movable trimming blade, an arm carrying the same, a support for said arm, said support comprising spaced vertical sleeves, posts engaging and guiding said sleeves, and means for moving said support on said posts.

7. A trimming mechanism including in combination a movable trimming blade, an arm carrying the same, a support for said arm, said support comprising spaced vertical sleeves, posts engaging and guiding said sleeves, a main shaft, an eccentric on said shaft, a lever engaging said eccentric and connected to said support, and a fulcrum support for said lever.

8. A trimming mechanism including in combination a movable trimming blade, an arm carrying the same, a support for said arm, said support comprising spaced vertical sleeves, posts engaging and guiding said sleeves, a main shaft, an eccentric on said shaft, a lever engaging said eccentric and connected to said support, and a fulcrum support for said lever, said fulcrum support being adjustable for varying the working position of the movable trimming member.

9. A trimming mechanism including a bed plate, a work support, a bracket attached to said bed plate, spaced fixed posts carried by said bracket, a support mounted to move vertically on said posts, means for moving said support up and down, an arm detachably connected with said support, a trimming blade mounted on said arm, and extending above and overhanging said work support, and a stationary trimming member carried by the work support, and coöperating with the movable trimming member.

10. A trimming mechanism including a bed plate, a work support carried thereby, a bracket attached to said bed plate, fixed posts mounted on said bracket, a support having sleeves engaging said posts, a forked arm carried by said support, a lever fulcrumed to the bed plate and having one end thereof engaging said forked arm, an eccentric engaging said lever between its ends for oscillating the same, and a movable trimming member carried by said support.

11. A trimming mechanism including a bed plate, a work support carried thereby, a bracket attached to said bed plate, fixed posts mounted on said bracket, a support having sleeves engaging said posts, a forked arm carried by said support, a lever fulcrumed to the bed plate and having one end thereof engaging said forked arm, an eccentric engaging said lever between its ends for oscillating the same, and a movable trimming member carried by said support, said movable trimming member extending above and overhanging said work support, and a stationary trimming member carried by the work support, and coöperating with said movable trimming member.

12. The combination of stitch forming mechanism, a work support, a trimming mechanism located in front of said stitching mechanism and including a stationary trimming member carried by the work support, a movable trimming member located beneath the work support and projecting above and overhanging said work support, spaced posts, a movable supporting member mounted on said posts for supporting said movable trimming member whereby it is moved up and down in the same path, a lever for moving said support for the trimming member up and down said lever and trimmer supporting member being located entirely beneath the work support.

13. The combination of stitch forming mechanism, a work support, a trimming mechanism located in front of said stitching mechanism and including a stationary trimming member carried by the work support, a movable trimming member located beneath the work support and projecting above and overhanging said work support, spaced posts, a movable supporting member mounted on said posts for supporting said movable trimming member whereby it is moved up and down in the same path, a lever for moving said support for the trimming member up and down, said lever and trimmer supporting member being located entirely beneath the work support and means for shifting the position of the lever for varying the relative position of the movable trimming member to the stationary trimming member.

In testimony whereof, I affix my signature, in the presence of two witnesses.

JAMES R. MOFFATT.

Witnesses:
C. McNeil,
A. B. Clothier.

Copies of this patent may be obtained for five cents each, by addressing the "Commissioner of Patents, Washington, D. C."